ies. A plu-
United States Patent
Borcuk

[11] 3,884,050
[45] May 20, 1975

[54] FORCE TRANSMITTING COUPLING
[75] Inventor: Louis J. Borcuk, Riverside, Calif.
[73] Assignees: Louis J. Borcuk; Joseph J. Borcuk, both of Riverside, Calif.
[22] Filed: Dec. 17, 1973
[21] Appl. No.: 425,510

[52] U.S. Cl. .............................. 64/19; 64/6; 64/31; 74/68
[51] Int. Cl. ............................................. F16d 3/54
[58] Field of Search ............ 64/19, 12, 6, 31, 27 R; 74/68, 67

[56] References Cited
UNITED STATES PATENTS

| 286,807 | 12/1882 | Landis | 64/31 |
|---|---|---|---|
| 327,741 | 10/1885 | True | 74/68 |
| 2,870,615 | 1/1959 | Walk | 64/19 |
| 3,242,694 | 3/1966 | Schmidt | 64/19 |
| 3,791,170 | 2/1974 | Schmidt | 64/19 |

FOREIGN PATENTS OR APPLICATIONS
| 788,103 | 10/1935 | France | 64/31 |

Primary Examiner—Samuel Scott
Assistant Examiner—Randall Heald
Attorney, Agent, or Firm—John H. Crowe; Peter H. Firsht

[57] ABSTRACT

A rotatable disk has a central post and a plurality of pairs of spaced legs at the periphery of the disk. A plurality of radially disposed links have apertured inner ends which are pivoted to the post and outer distal ends loosely received between the pairs of legs, respectively, each link having a force transmitting pin intermediate its ends. A plate has a number of elongated openings equal in number to the pins and loosely receiving the same.

10 Claims, 4 Drawing Figures

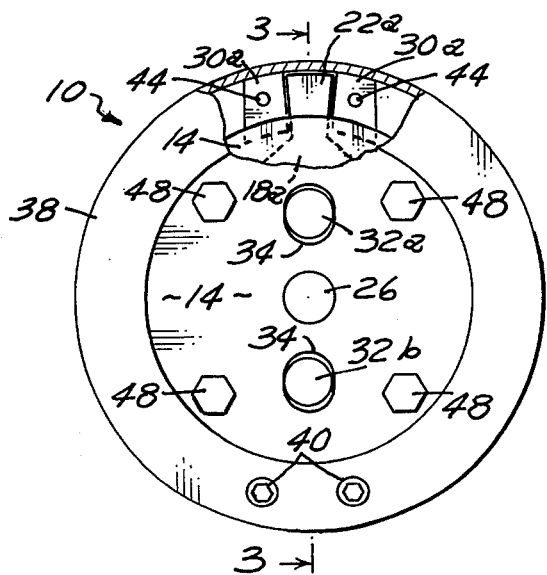
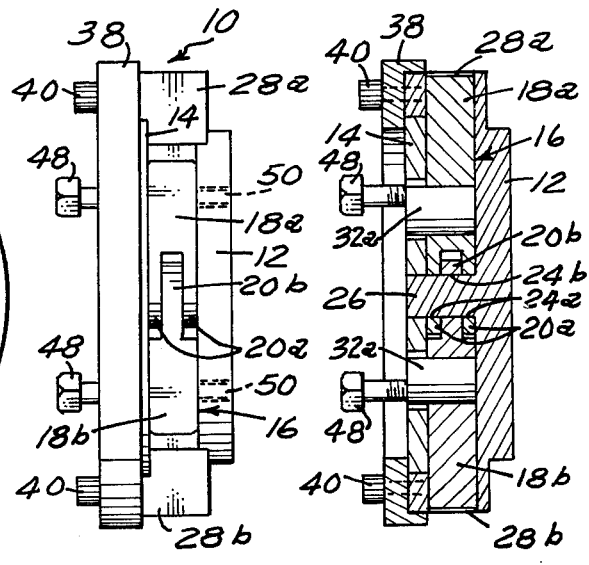
FIG. 2.  FIG. 1.  FIG. 3.
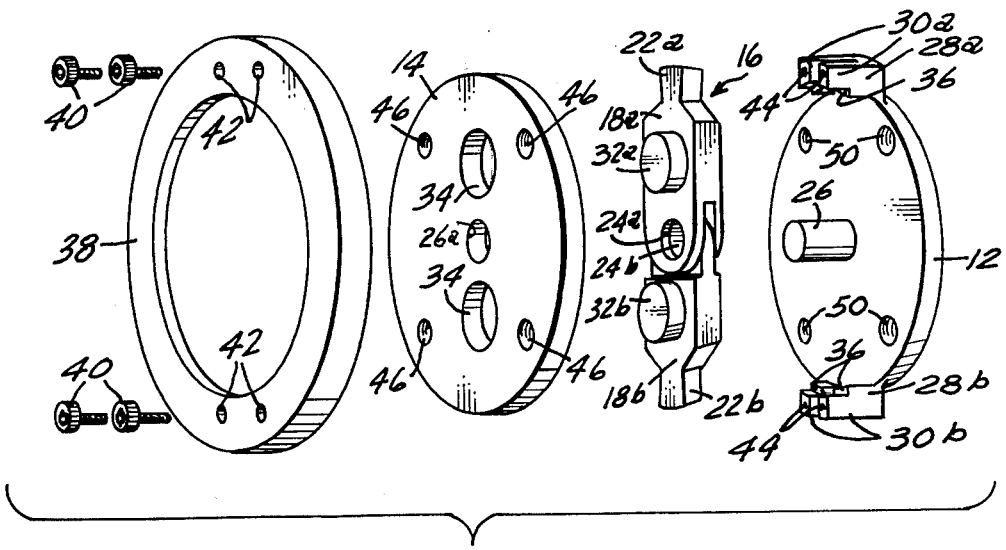
FIG. 4.

Н. 3,884,050

FORCE TRANSMITTING COUPLING

BACKGROUND OF THE INVENTION

The present invention relates to force transmitting systems, and more particularly to a novel power or force transmitting coupling which transmits force in an efficient manner. Various systems have been devised for transmitting force or power, as exemplified by Ser. Nos. 268,807; 703,396; U.S. Pat. Nos. 1,227,188; 1,949,860; 3,221,566 and 3,258,988.

The present invention provides a lightweight coupling of simpler and more economical construction.

SUMMARY OF THE INVENTION

A primary object of the present invention is to provide a coupling for transmitting force in an efficient manner.

Another object is to provide a coupling which is relatively light in weight and of simpler and relatively inexpensive construction.

A further object is to provide a coupling which interconnects a power shaft and a load shaft by means of plates and linkage or leverage means.

These and other objects and advantages are achieved by the provision of a power plate or disk which has distal force transmitting members at its periphery, the members engaging force transmitting linkage or levers pivotally connected to a central post on the disk, each carrying a pin intermediate the post and the associated members, the pins being received in openings in a load plate or disk and engageable with the sides of the openings for transmitting force to the load plate.

BRIEF DESCRIPTION OF THE DRAWINGS

FIG. 1 is a side elevational view of a coupling in accordance with the present invention;

FIG. 2 is a front elevational view of the coupling, with parts broken away to illustrate structural detail;

FIG. 3 is a vertical sectional view taken generally along line 3—3 of FIG. 2; and FIG. 4 is an exploded perspective view of the coupling.

DESCRIPTION OF THE PREFERRED EMBODIMENT

Referring to the drawings, there is shown in FIG. 1 a coupling 10 embodying the principles of the present invention, and including a power plate or disk 12, a load plate 14, better seen in FIGS. 2, 3 and 4, and interconnecting linkage or leverage means 16.

The leverage means 16 include a pair of links or levers 18a and 18b. Lever 18a has a slotted inner or proximal end 20a and an outer or distal tang end 22a; and lever 18b has an inner or proximal end 20b and an outer or distal tang end 22b, the end 20b fitting in the slot of the end 20a, as shown in FIGS. 1 and 3. The end 20a is provided with a pair of aligned apertures 24a and end 20b has an aperture 24b which is aligned with the apertures 24a, the apertures 24a and 24b receiving, with a close fit, a central pivot pin or post 26 on the power plate or disk 12.

The disk 12 has fixed thereto, at its periphery, a pair of oppositely disposed generally U-shaped members 28a and 28b. Member 28a has a pair of spaced legs 30a between which the distal end 22a is received with a loose fit, as shown in FIG. 2, to prevent binding, and permit the lever 18a to pivot slightly about the pivot post 26. The member 28b has a pair of spaced legs 30b and the distal end 22b is fitted loosely therebetween for preventing binding and slight pivoting of lever 18b. The legs 30a and 30b extend generally parallel to the post 26.

Lever 18a has a pin or post 32a and lever 18b has a pin or post 32b. The pins are parallel to the post 26 and are received in elongated apertures 34 in the load plate 14, which apertures are slightly oversize. Thus, depending upon the direction of rotation of the pins, a side of each of the apertures is engaged by a side of the associated pin along a line and binding is prevented. The plate 14 is adapted to abut shoulders 36 formed on the U-shaped members 28a and 28b, and is retained by a retaining ring 38, which permits relative movement of the plate. The ring is held in place by screw bolts 40 passing through aperture 42 in the ring and received in threaded openings 44 in the ends of the legs 30a and 30b.

Load plate 14 is provided with a plurality of threaded apertures 46 which receive bolts 48 for attachment of a load shaft, or the like (not shown). Power plate 12 has threaded openings 50 which are adapted to receive bolts, not shown, for attachment of a power shaft, or the like, not shown.

It is believed that the operation of the coupling of the present invention is readily apparent and is briefly summarized at this point. With rotation imparted to the power plate 12, one of the legs 30a engages the adjacent side of tang end 22a and similar action takes place between one of the legs 30b and the adjacent side of the tang end 22b. This causes each of the force transmitting pins 32a and 32b to engage a side of its associated aperture 34 and force is transmitted to the load plate 14 and to its attached load.

There has thus been provided a force transmitting coupling of simple construction which operates for efficient transmission of power.

While I have shown and described in considerable detail what I believe to be the preferred form of the invention, it will be understood that various changes may be made in the several parts without departing from the broad scope of the following claims. For example, the number of links or levers and U-shaped members can be varied. Also, the application of power or force can be reversed from the load plate to the power plate.

What is desired to be protected by Letters Patent of the United States is:

1. A force transmitting coupling comprising:
   a rotatable plate having a central part and distal force transmitting means;
   linkage means including a link pivotally connected to said part and engaged by said force transmitting means;
   a force transmitting member carried by said link and located intermediate said central part and associated distal force transmitting means; and
   an apertured plate having an opening in which the force transmitting member is received.

2. The coupling of claim 1 wherein said force transmitting means includes a pair of legs loosely engaging the link.

3. The coupling of claim 1 wherein each force transmitting member is loosely fitted in said opening.

4. The coupling of claim 1 wherein said force transmitting means includes a pair of spaced legs and the link has a distal end loosely received between said legs, and said force transmitting member is loosely received in said opening.

5. The coupling of claim 1 wherein said linkage means includes a plurality of links, each link having an inner end pivoted to said post and an outer end loosely engaged by said force transmitting means.

6. The coupling of claim 5 wherein said force transmitting means includes a plurality of pairs of spaced legs, each pair of legs loosely receiving an outer end of a link.

7. The coupling of claim 6 wherein said pairs of legs are provided with shoulder surfaces, and said apertured plate is held thereagainst.

8. The coupling of claim 1 wherein said first-named plate is a disk, said central part is a pivot post, said linkage means include a plurality of radially disposed links having inner ends with apertures in which the pivot post is received with a close fit, and said force transmitting means includes pairs of spaced legs at the periphery of the disk, the links having distal ends loosely received between said pairs of legs, respectively.

9. The coupling of claim 8 wherein each link has a rigid pin, and said apertured plate has openings in which the respective pins are received.

10. The coupling of claim 9 wherein said openings are elongated and the pins are loosely received therein and engage the sides thereof for transmitting force to the apertured plate.

* * * * *